Patented Oct. 10, 1933

1,929,476

UNITED STATES PATENT OFFICE 1,929,476

PROCESS FOR PRODUCING PURE PHOSPHATES

Charles F. Booth, Anniston, Ala., assignor to Swann Research, Incorporated, a corporation of Alabama No Drawing. Application December 16, 1931
Serial No. 581,516

9 Claims. (Cl. 23—107)

This invention relates to a process of producing pure ortho-phosphates.

One object of this invention is the provision of a process for the production of pure solutions of alkali metal or ammonium ortho-phosphates from solutions containing impurities particularly iron and aluminum.

Another object of this invention is the provision of a process for the production of the ordinary alkali metal phosphates such as the mono- or di-sodium or potassium ortho-phosphates or the mono- or di-ammonium ortho-phosphates in a pure form. Pure ortho-phosphates are considered to come within the object of this invention when they produce little or no turbidity when dissolved in water.

Previously known methods of producing the alkali metal or ammonium phosphates in relatively pure form involve recrystallization of the crystals one or more times. Such a procedure is exceedingly undesirable from the standpoint of cost, occasioned not only by the expense of these operations, but also by reason of the low yield of pure salt due to the accumulation of large quantities of salts in impure mother liquor. The mono-basic alkali metal or the mono-ammonium ortho-phosphates, being somewhat acid in solution, are furthermore difficult to purify of contained iron and aluminum compounds since these compounds do not precipitate completely unless the pH of the solution is considerably greater, i. e., the solution is more alkaline than that of the corresponding mono-basic salt solutions. Even under conditions of greater alkalinity it is difficult to remove the impurities such as iron or aluminum compounds completely.

I have now found that by treating the mono-basic ortho-phosphate solution with a manganese compound in which the manganese has an average valence of three, I am enabled to remove any associated impurities such as iron or alumina or both completely and at very little cost. Such removal will consist of clarification by well known means such as filtration or decantation.

Having prepared a pure mono-basic ortho-phosphate solution by my invention I may remove the former from solution by known means such as evaporation and crystallization, or I may by the further addition of appropriate basic reagents form the di- or tri-basic ortho-phosphates which may then be removed from solution in like manner.

In order that others may understand my improved method of working I will describe my invention as applied to the production of pure ammonium phosphate. It will, of course, be understood that it may be applied in like manner to the production of alkali metal phosphates, without departing from the spirit of the herein claimed invention.

To ortho-phosphoric acid containing say 0.35% of iron and aluminum phosphates add ammonia until a 5 cubic centimeter sample requires 0.5 to 1.0 c. c. of $\frac{N}{2}$ acid for titration to the methyl orange end point. Add sufficient water so that the specific gravity of the solution is in the neighborhood of 1.18 at 25° C. I now add to the solution a manganese compound in the trivalent state of oxidation to effect precipitation.

Since the trivalent manganese, which I employ in effecting precipitation of the iron and aluminum compounds, is not readily available commercially, I prefer to prepare it directly in the solution to be treated. This may be done in either one of several ways as suggested below under a, b, or c.

(a) As a source of divalent manganese, I may employ the readily available commercial grade of manganese sulphate ($MnSO_4.4H_2O$). Sufficient of this salt is added to the ammonium phosphate solution as prepared above to give from 0.013 to 0.105% of manganese in the solution. The divalent manganese is now brought to the next higher state of oxidation by the addition of potassium permanganate. Usually from 0.572 to 0.645 pounds of $KMnO_4$ per pound of manganese present in the solution is required. The addition of this compound will oxidize the divalent manganese to the trivalent form, at the same time being itself reduced to the trivalent form.

(b) Starting with tetra-valent manganese, I may employ the readily available manganese dioxide. This compound is added directly to the above mentioned ammonium phosphate solution, together with sufficient oxalic acid to reduce this compound to the trivalent form. In order to effect this reaction the solution is boiled.

(c) Starting with hepta-valent manganese I may employ ordinary potassium permanganate, adding sufficient oxalic acid to reduce the manganese to the trivalent form.

The solution treated by either of the three methods outlined above is now boiled to effect complete precipitation of the impurities and the added manganese compounds. It is then cooled and clarified by filtration or decantation. If the solution is somewhat pink due to the presence of some colored manganese compound, as is some-times the case, I preferably discharge this by the addition of a sufficient quantity of oxalic acid. In order to crystallize mono-ammonium phosphate from solution it is preferably concentrated by evaporation to a specific gravity of 1.36 at 100° C., after which it is again cooled. The separated crystals are removed in the ordinary manner with a centrifuge, the mother liquor being further concentrated by evaporation, or returned to the beginning of the cycle. Although I have described my process as employing a manganese compond in which this compound has a valence of three, it will be understood that I am undoubtedly working with a mixture of compounds in which the average valence of the manganese is three. As is usual in solutions of this type some manganese will be present in a higher and also in a lower state of oxidation. If, however, a mixture of compounds having an average valence of three is employed, it will be found to be effective for the purpose claimed.

I may of course prepare diammonium phosphate by the further addition of ammonia to the pure concentrated mono-ammonium phosphate solution obtained as above. Crystallization of this product is effected in known manner.

While I have described in detail one method for treating an ammonium phosphate prepared from an acid originally containing in the neighborhood of 0.35% iron and aluminum phosphate, my method may also be applied to solutions of phosphates prepared from acid having greater or lesser amounts of these impurities, by varying somewhat the proportions of trivalent manganese employed. Where greater amounts of these impurities are present a greater quantity of manganese is required and vice versa.

My method is also applicable to the purification of solutions of other mono-basic phosphates such as sodium and potassium phosphates.

I claim:

1. Process of producing pure alkali metal or ammonium ortho-phosphates from aqueous solutions of said phosphates containing impurities, comprising forming in solutions of the corresponding mono-basic ortho-phosphates, a trivalent manganese compound and thereby precipitating said impurities and then removing the same from said aqueous solutions.

2. Process of producing pure ammonium orthophosphates from aqueous solutions containing ammonium ortho-phosphates associated with impurities comprising forming in solutions of mono-ammonium ortho-phosphate a trivalent manganese compound and thereby precipitating said impurities from said aqueous solutions.

3. Process of producing pure ammonium orthophosphate from aqueous solutions containing ammonium ortho-phosphate associated with iron and aluminum compounds comprising forming a trivalent manganese compound in said solution, precipitating said iron and aluminum compounds while the ortho-phosphate is in the monobasic stage and then recovering ammonium orthophosphate from said solution.

4. Process of producing pure mono-ammonium ortho-phosphate from aqueous solutions containing said mono-ammonium ortho-phosphate together with iron and aluminum compounds comprising forming a trivalent manganese compound in said solution, precipitating said iron and aluminum compounds, clarifying said solutions and recovering said orthophosphate from solution.

5. Process of producing mono-sodium orthophosphate from aqueous solutions containing said ortho-phosphate together with iron and aluminum compounds comprising forming a trivalent manganese compound in said solution precipitating said iron and aluminum compounds, clarifying said solution and recovering said sodium orthophosphate from solution.

6. In the process of producing pure alkali-metal or ammonium orthophosphates, the step of purifying aqueous solutions of monobasic orthophosphates containing iron and aluminum as impurities, comprising forming in said aqueous solutions a dissolved trivalent manganese compound and precipitating thereby said iron and aluminum compounds.

7. In the process of producing pure alkali-metal or ammonium orthophosphates, the step of purifying aqueous solutions of monobasic orthophosphates containing iron and aluminum compounds as impurities, comprising adding to said aqueous solution a divalent manganese salt and oxidizing said divalent salt to the trivalent stage and precipitating thereby said iron and aluminum compounds.

8. In the process of producing pure alkali-metal or ammonium orthophosphates, the step of purifying aqueous solutions of monobasic orthophosphates containing iron and aluminum compounds as impurities, comprising adding to said aqueous solutions a tetravalent manganese compound, reducing said tetravalent manganese to the trivalent form and precipitating thereby said iron and aluminum compounds from said solution.

9. In the process of producing pure alkali-metal or ammonium orthophosphates, the step of purifying aqueous solutions of monobasic orthophosphates containing iron and aluminum compounds as impurities, comprising adding to said aqueous solution a heptavalent manganese compound, reducing said heptavalent manganese to the trivalent form by means of oxalic acid, and precipitating said iron and aluminum compounds from solution.

CHARLES F. BOOTH.